(12) United States Patent
Ozawa et al.

(10) Patent No.: US 7,843,540 B2
(45) Date of Patent: Nov. 30, 2010

(54) LIQUID CRYSTAL DISPLAY DEVICE AND ELECTRONIC APPARATUS

(75) Inventors: Kinya Ozawa, Suwa (JP); Hideo Shimamura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 774 days.

(21) Appl. No.: 11/332,147

(22) Filed: Jan. 17, 2006

(65) Prior Publication Data

US 2006/0203169 A1 Sep. 14, 2006

(30) Foreign Application Priority Data

Feb. 28, 2005 (JP) .............................. 2005-054822

(51) Int. Cl.
*G02F 1/1343* (2006.01)

(52) U.S. Cl. .................... 349/141; 349/114; 349/88

(58) Field of Classification Search ................ 349/141, 349/106

See application file for complete search history.

(56) References Cited

U.S. PATENT DOCUMENTS

| | | | |
|---|---|---|---|
| 5,760,863 A | 6/1998 | Funfschilling et al. | |
| 6,157,425 A * | 12/2000 | Kuo et al. | 349/88 |
| 6,266,109 B1 * | 7/2001 | Yamaguchi et al. | 349/86 |
| 6,525,798 B1 * | 2/2003 | Yamakita et al. | 349/141 |
| 7,420,635 B2 * | 9/2008 | Ozawa | 349/114 |
| 2003/0218664 A1 * | 11/2003 | Sakamoto et al. | 347/114 |

FOREIGN PATENT DOCUMENTS

| | | |
|---|---|---|
| CN | 1188132 A | 7/1998 |
| CN | 1544978 A | 11/2004 |
| JP | A-2001-337339 | 12/2001 |
| JP | A-2002-214644 | 7/2002 |
| JP | A-2003-50388 | 2/2003 |
| JP | A 2003-207795 | 7/2003 |
| JP | A 2003-327966 | 11/2003 |

OTHER PUBLICATIONS

"Liquid Crystal Device Handbook," edited by the 142$^{nd}$ Committee of Japanese Institute for the Promotion of Technology (Nippon Gakujutsu Shinkokai), published by Nikkan Kogyo Shinbunsha, 1995, pp. 346-348.

* cited by examiner

*Primary Examiner*—David Nelms
*Assistant Examiner*—Thanh-Nhan P Nguyen
(74) *Attorney, Agent, or Firm*—Oliff & Berridge, PLC

(57) ABSTRACT

A liquid crystal display device of the present invention is a liquid crystal display device having a first substrate, a second substrate, a liquid crystal layer disposed between the first and second substrates, and a plurality of pixels each having a display region, in that: the liquid crystal layer is optically isotropic when an selective electric field is not applied and optically aisotropic when an electric field is applied and includes a material whose refractive index changes depending on the strength of the electric field; and the plurality of pixels include first and second pixels different in the electric field strength.

15 Claims, 6 Drawing Sheets

LIQUID CRYSTAL DISPLAY DEVICE AND ELECTRONIC APPARATUS

BACKGROUND

1. Technical Field

The present invention relates to a liquid crystal display device and an electronic apparatus.

2. Related Art

Flat panel display devices are now used widely in various types of monitors such as for computers as well as in display elements such as for cellular phones. It is predicted that the use of the flat panel display devices will continue to spread more widely, as they are being developed for use in widescreen TVs. Of all the flat panel displays, the most widely used is a liquid crystal display, which often employs a color display system called a micro color filter system.

The micro color filter system is a system that can easily exhibit high reproduction performance, in that full color display is performed by dividing one pixel into at least three sub-pixels and by forming, in each sub-pixel, color filters of three primary colors of red (R), green (G), and blue (B). However, by the micro color filter system, it is difficult to satisfactorily increase light utilization efficiency because of color absorption and the like by the color filters. In a transmission-type liquid crystal display device having a backlight or in a reflection-type liquid crystal display device having a front light, such poor light utilization efficiency becomes the cause for increase in electricity consumption by the backlight or the front light.

In contrast, an electrically controlled birefringence (ECB) type liquid crystal display device is known as the color liquid crystal display device that does not use color filters (e.g., see "Liquid Crystal Device Handbook," edited by the 142nd Committee of Japanese Institute for the Promotion of Technology (Nippon Gakujutsu Shinkokai), published by Nikkan Kogyo Shinbunsha, 1995, pp. 346-348). When a voltage is applied to a liquid crystal cell, birefringence in the cell changes as a result of a change in the liquid crystal molecule alignment due to dielectric anisotropy of the liquid crystal. When the liquid cell is placed between two polarizing plates, the change in the birefringence emerges as a change in light transmission. This is called an electrically controlled birefringence (ECB) effect. With the ECB-type liquid crystal display device, display is performed by taking advantage of such an effect.

In the present specification, refractive index may mean a general refractive index or the above-referenced birefringence and is not limited to one or the other.

The following explains the operational principles of the ECB-type liquid crystal display device.

A homogenous cell using liquid crystal having a refractive index anisotropy Δn and a cell thickness d is placed between two polarizing plates (a polarizer and an analyzer). When angles of a director axis of liquid crystal molecules to the polarizer and to the analyzer are $\Psi$ and $\chi$, respectively, a retardation R and a phase difference $\delta$ between extraordinary light and ordinary light that are generated when light passes through the cell are expressed below by the equations (1) and (2), respectively.

$$R = \Delta n \times d \qquad (1)$$

$$\delta = 2\pi R/\lambda = 2\pi \times \Delta n \times d/\lambda \qquad (2)$$

Further, a transmission intensity of light (J) entering perpendicularly to the cell is expressed in the equation (3).

$$J = A^2 \{\cos^2(\Psi-\chi) - \sin 2\Psi \sin 2\chi \sin^2(\delta/2)\} \qquad (3)$$

Further, when the two polarizing plates are crossed perpendicularly to each other, and $(\chi-\Psi=\pi/2)$ and $\Psi=\pi/4$, the transmitted light intensity J is expressed in the equation (4).

$$J = A^2 \sin^2(\delta/2) = A^2 \sin^2(\pi \Delta n d/\lambda) \qquad (4)$$

These equations indicate that the transmitted light intensity depends on the retardation R when monochrome light is used, and various color phases are exhibited depending on the retardation R when white light is used as the light source. When voltage is applied to the liquid crystal cell, the retardation R changes since the effective refractive index anisotropy in the cell changes along with the liquid crystal molecule alignment. Based on the explained principles, the ECB-type liquid crystal display device controls the transmitted light intensities and display colors by the application of voltage in order to carry out the display.

With a generally-used color liquid crystal display device that employs a system such as a liquid crystal light valve system in combination with color filters, only one color is displayed with one sheet of cell or with one pixel, while the ECB-type color liquid crystal display device enables the color display relatively stably due to its simple structure using one sheet of cell and two polarizing plates.

However, with the conventional ECB-type color liquid crystal display device, the volume of the applied voltage must be controlled precisely in order to change the color phases to be displayed.

Further, with the conventional ECB-type color liquid crystal display device, even if the pixel is divided into display regions of each color, the lights interfere with each other among the regions and, thus, vivid color display has been difficult. Also, because the retardation R changes greatly depending on the visual angle, the strong visual angle dependency of the display color has been a problem.

SUMMARY OF THE INVENTION

An advantage of the invention is to provide a highly reliable liquid crystal display device with enhanced light utilization efficiency, a wide visible angle, and high visibility, and to provide an electronic apparatus having the liquid crystal display device.

According to an aspect of the invention, a liquid crystal display device of the present invention is a liquid crystal display device having a first substrate, a second substrate, a liquid crystal layer disposed between the first and second substrates, and a plurality of pixels each having a display region, in that: the liquid crystal layer is optically isotropic when an selective electric field is not applied and optically aisotropic when an electric field is applied and includes a material whose refractive index changes depending on the strength of the electric field; and the plurality of pixels include first and second pixels different in the electric field strength.

In this case, it is possible to provide the highly reliable liquid crystal display device with enhanced light utilization efficiency, a wide visual angle (wide viewing angle), and high visibility.

According to another aspect of the invention, a liquid crystal display device of the invention is a liquid crystal display device having a first substrate, a second substrate, a liquid crystal layer disposed between the first and second substrates, and a plurality of pixels having display regions, in that: a first electrode and a second electrode are formed at each of the pixels; the liquid crystal layer is optically aisotropic when a voltage is applied between the first electrode and the second electrode and optically isotropic when a voltage is not applied and is formed by including a material whose refractive index changes depending on the voltage strength; and a distance between the first electrode and the second electrode at a first pixel of the plurality of pixels is different from a distance between the first electrode and the second electrode at a second pixel of the plurality of pixels.

In this case, it is possible to provide the highly reliable liquid crystal display device with enhanced light utilization efficiency, a wide visual field angle (wide viewing angle), and high visibility.

With the liquid crystal display device of the invention, it is preferable that a first display region in the first pixel and a second display region in the second pixel is different in color.

In this case, a plurality of colors can be displayed.

With the liquid crystal display device of the invention, it is preferable that the liquid crystal layer in the first display region and the liquid crystal layer in the second display region have different refractive indexes.

In this case, there is no need to use a complex driving method, since it is specified that the refractive index changes depending on the display color of the pixel even when the same voltage is applied to each pixel.

With the liquid crystal display device of the invention, it is preferable that the plurality of pixels include a pixel of a first color and a pixel of a second color which are lights emitted from the liquid crystal layer; a gap between the first electrode and the second electrode in the pixel of the first color is greater than a gap in the pixel of the second color; and the light emitted from the pixel of the first color is a visible light shorter than the light emitted from the pixel of the second color.

In this case, it is possible to easily and reliably alter the strength of the electric fields applied to the display regions of each color (read, green, and blue display regions).

With the liquid crystal display device of the invention, it is preferable that the first color is blue and the second color is green.

In this case, each pixel can have at least a blue display region or green display region. This blue and green combination is only an example, and blue and red combination or green and red combination may be applied.

With the liquid crystal display device of the invention, it is preferable that a reflective film is formed on the first substrate and that a phase difference Δnd in the liquid crystal layer on the reflective film is approximately λ/4.

In this case, with the reflection-type liquid crystal display device, the transmitted light intensity can be greater.

With the liquid crystal display device of the invention, it is preferable that the phase difference Δnd in the liquid crystal layer, through which the light coming into the first substrate and emitting from the second substrate transmits, is approximately λ/2.

In this case, with the transmission-type liquid crystal display device, the transmitted light intensity can be greater.

With the liquid crystal display device of the invention, it is preferable that the material contained in the liquid crystal layer is pseudo-isotropic liquid crystal.

With the liquid crystal display device of the invention, it is preferable that the material contained in the liquid crystal layer is formed by polymerizing a low molecule liquid crystal material and a non liquid crystal monomer and is composed of a composite liquid crystal composition containing a polymer network formed among the constituent molecules of the low molecule liquid crystal material.

Accordingly, the response speed of liquid crystal can be particularly fast.

With the liquid crystal display device of the invention, it is preferable that the low molecule liquid crystal material is capable of developing a blue phase between a cholesteric phase and an isotropic phase.

In this case, the response speed of liquid crystal can be made even faster.

With the liquid crystal display device of the invention, it is preferable that the non liquid crystal monomer is an acrylate-based monomer having an alkyl group as the side chain.

In this case, it is possible to form a highly continuous network and to further expand the temperature range at which the blue phase is developed.

According to yet another aspect of the invention, an electronic apparatus of the invention is equipped with the liquid crystal display device of the invention.

In this case, it is possible to provide an electronic apparatus equipped with the highly reliable liquid crystal display device (a display section) with enhanced light utilization efficiency, a wide visible angle, and high visibility.

BRIEF DESCRIPTION OF THE DRAWINGS

The invention will be described with reference to the accompanying drawings, wherein like numbers reference like elements.

DESCRIPTION OF THE EMBODIMENTS

Embodiments of the invention will now be described in detail with reference to the drawings.

Liquid Crystal Display Device

Fist, the liquid crystal display device of the invention will be described.

First Embodiment

Figure 1:
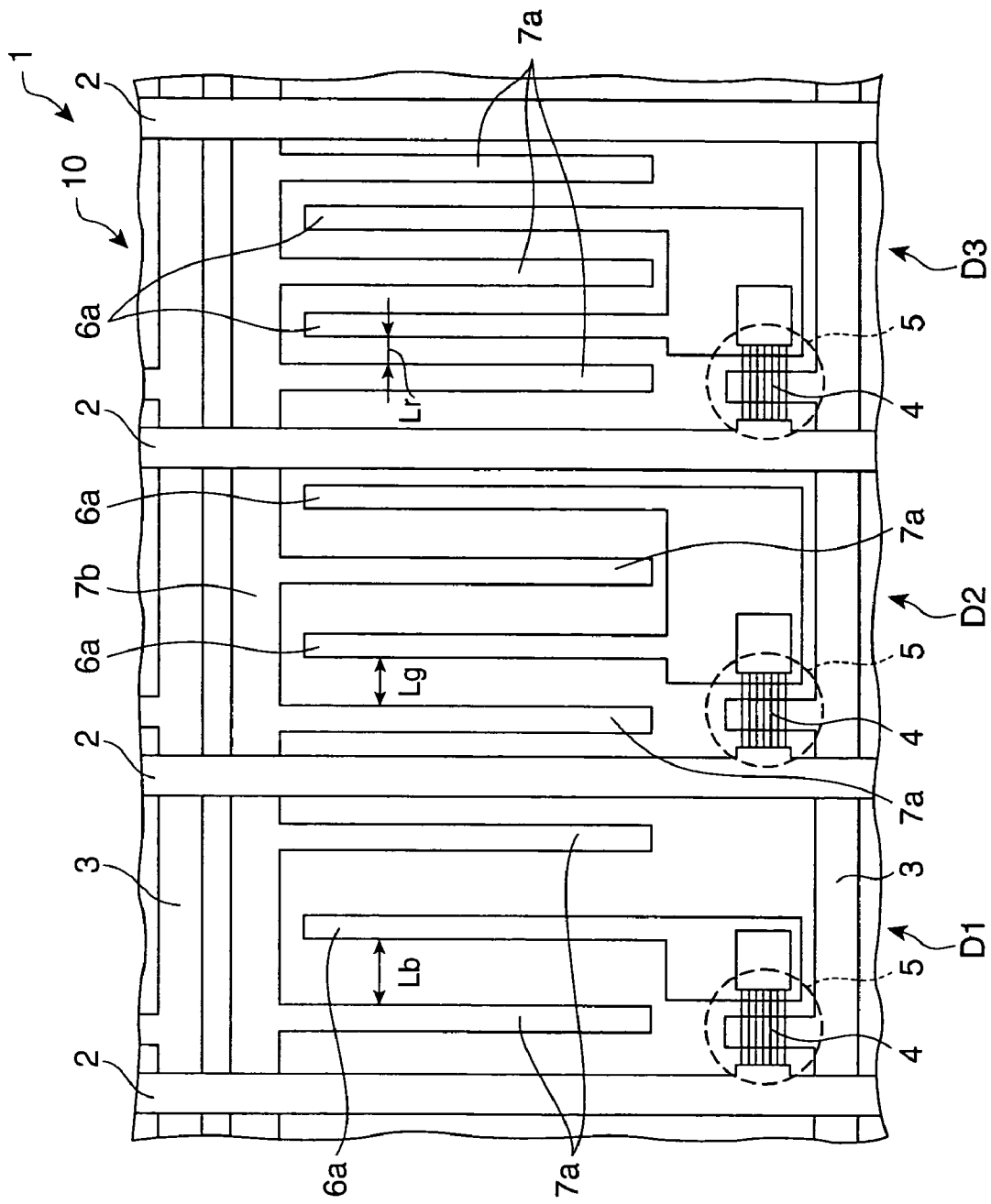
FIG. 1 is a plan pattern view of an example of an electrode structure of a liquid crystal display device of the invention.

FIG. 1 is a plan view of an electrode structure of a TFT array substrate of the liquid crystal display device of the first embodiment. FIGS. 2A and 2B are pattern diagrams of the liquid crystal display device of the embodiment, in that FIG. 2A is a plan pattern view to explain three display regions of the liquid crystal display device of the embodiment corresponding to three primary colors, and FIG. 2B is a cross-sectional pattern view of FIG. 2A. Further, for simplicity's sake, FIGS. 1, 2A, and 2B show one enlarged pixel region (one pixel), emphasizing specific portions and altering the ratios of the film thickness, size, and the like of each constituent element where necessary.

The liquid crystal display device of the embodiment is an exemplary of an active matrix type liquid crystal display device using a thin film transistor (hereinafter referred to as TFT) as the switching element.

With a liquid crystal display device 1, as shown in FIGS. 2A and 2B, a liquid crystal layer 30 composed, for example, of a hereinafter-described pseudo-isotropic liquid crystal material or the like is disposed between a TFT array substrate 10 and an opposite substrate 20 arranged opposite from the TFT array substrate 10. The TFT array substrate 10 takes an in-plane switching (hereinafter referred to as IPS) electrode structure, in that an electric field (a lateral electric field) is generated in a planar direction of the substrate (a direction parallel to the substrate surface), and, by changing the alignment state of the liquid crystal material by this lateral electric field, the TFT array substrate 10 acquires an optical switching function.

By the IPS mode, the alignment of the liquid crystal material shifts into a direction parallel to the substrate upon supply of voltage. Therefore, the wide visual angle (of about 170° laterally and vertically, for example) becomes possible, and there is little change in color tones at any gradation from white to black regardless of viewing directions, and, thereby, natural images can be displayed.

An electrode structure of the TFT array substrate 10 is shown in FIG. 1. In the drawing, a plurality of data lines 2 extending vertically and a plurality of gate lines 3 extending horizontally intersect with each other in matrix. The data lines 2 have a function of transmitting image signals to the pixels in each column, and the gate lines 3 have a function of sequentially switching on the TFTs of the pixels in each row. The lower left part of each pixel in the drawing, where the gate line 3 branches towards the inside of the pixel and becomes a gate electrode 4, constitutes a pixel-switching TFT 5.

With the TFT of each pixel, one end of the terminal of the source and the drain is connected to the data line 2, and the other end of the terminal is connected to a first electrode 6. This first electrode 6 has a plurality of electrode fingers (a pixel electrode) 6a extending in a vertical direction in the drawing and is connected to the drain terminal of the TFT 5.

Further, in FIG. 1, a comb-like shaped second electrode 7 having a plurality of electrode fingers (a common electrode) 7a extends in a vertical direction. The electrode fingers 7a of the second electrode 7 are two-dimensionally arranged between the electrode fingers 6a of the first electrode 6. Also, each electrode finger 7a is connected to a common electrode line 7b. The second electrodes 7 are connected to each other by each of the pixels and are configured so that a fixed voltage is maintained in the entire display region. That is, the first electrode 6 (electrode fingers 6a) is the pixel electrode, and the second electrode 7 (electrode fingers 7a) is the common electrode. Further, the data lines 2, gate lines 3, first electrode 6 (electrode fingers 6a), second electrode 7 (electrode fingers 7a and common electrode line 7b), and TFT 5 are all disposed on the TFT array substrate 10.

Additionally, although the common electrode line 7b is fabricated so as to intersect with the data lines 2 and to parallel with the gate lines in FIG. 1, other fabrications are possible as long as the electrode fingers 6a and the electrode fingers 7a are arranged in a comb-like configuration. For example, the common electrode line 7b may be fabricated so as to intersect with the gate lines 3 and to parallel with the data lines 2.

Also, a region surrounded by the data lines 2 and the gate lines 3 composes one pixel of the liquid crystal display device of the embodiment.

The term pixel or pixel region used here may be any pixel or pixel region that includes only one area surrounded by the data lines 2 and the gate lines 3, and may or may not include a region overlapping with these data lines 2 or these gate lines 3.

FIG. 2A is a cross-sectional diagram of each of the pixels corresponding to the three primary colors in FIG. 1, in which each display region of each pixel, that is, a blue display region D1, a green display region D2, and a red display region D3 is disposed.

The TFT array substrate 10 is configured in a manner that a reflection film 13 composed of a metal material having high reflectivity such as aluminum is formed on the surface of a substrate body 11 composed of a light transmitting material such as quartz and glass via an insulating layer 12 composed of a resin material or the like.

The insulating layer 12 formed on the substrate body 11 has an uneven configuration 12a at the surface, and the surface of the reflection film 13 has an uneven portion corresponding to the uneven configuration 12a. Because the reflection light scatters due to such unevenness, reflection from outside can be prevented, and the display having the wide visual field angle can be obtained. The uneven configuration 12a is further coated with a resin layer 14.

Further, as the pixel electrodes, the first electrodes 6 and the second electrodes 7 composed of a transparent conductive material such as indium tin oxide (hereinafter referred to as ITO) are formed on the surface of the TFT array substrate 10.

Additionally, in the embodiment, although the reflection film 13 and the pixel electrodes are independently laminated, a reflection film composed of a metal material may be used as the pixel electrode.

On the opposite substrate 20, a black matrix BM is disposed on a substrate body 21 (on the liquid crystal layer side of the substrate body 21) composed of a light transmitting material such as glass or quartz. This black matrix BM forms borders between the display regions D1, D2, and D3 (see FIG. 2A).

Further, a retardation plate 16 and a polarizing plate 17, which are formed on the outer surface of the TFT array substrate 10 (not the surface facing the liquid crystal layer 30), and a retardation plate 24 and a polarizing plate 25, which are formed on the outer surface of the opposite substrate 20, are structured so that a circularly polarized light can enter into an inner surface side of the substrate (the liquid crystal layer 30 side). Each of these retardation plates 16 and 24 and polarizing plates 17 and 25 composes a circularly polarizing plate.

The polarizing plates 17 and 25 are structured so as to transmit only a linearly polarized light having a polarization axis in a predetermined direction. As the retardation plates 16 and 24, λ/4 retardation plates are used.

As regards the size of each part composing the liquid crystal display device of the embodiment, it is preferable that a pitch of one pixel is, but not limited to, around 30-100 µm, and that a cell gap d is, but not limited to, around 3-5 µm.

Further, it is preferable that the width of each electrode finger 6a of the first electrode 6 and of each electrode finger 7a of the second electrode 7 is about 1-4 µm.

More specifically, it is preferable that the pitch of one pixel is about 30 µm, and that the number of the electrode fingers 6a of the first electrode 6 and of electrode fingers 7a of the second electrode 7 is about 3-5 each. Also, the width of each electrode finger 6a of the first electrode 6 and of each electrode finger 7a of the second electrode 7 is preferably about 2 µm.

The described liquid crystal display device 1 employs the IPS electrode structure, in which the first and second electrodes 6 and 7 are arranged within the same surface of the TFT substrate 10. Accordingly, the liquid crystal is driven by a lateral electric field F generated by the first electrode 6 (6a) and the second electrode 7 (7a).

Now, with the ECB-type liquid crystal display device, the the transmitted light intensity (J) is expressed in the equation (4) below.

$$J = A^2 \sin^2(\delta/2) = A^2 \sin^2(\pi \Delta n d/\lambda) \quad (4)$$

$\delta$ is a phase difference value here, and $\delta = 2\pi \Delta n d/\lambda$. The equation shows that, by changing $\delta$, that is, by changing the refractive index anisotropy $\Delta n$ of the liquid crystal, the display colors and the transmitted light intensity can be changed.

It is to be noted that it is difficult to greatly change the refractive index anisotropy $\Delta n$ of liquid crystal at each display region by using a common liquid crystal material, even if it is used in a liquid crystal display device such as one described above having a plurality of display regions (three display regions corresponding to three primary colors) in one pixel. To explain more specifically, with the common liquid crystal material, because a liquid molecule is greatly affected by the alignment of other surrounding liquid crystal molecules upon application of the electric field and changes its own orientation, it is difficult to greatly change the refractive index anisotropy $\Delta n$ of the liquid crystal at each of the display regions (the blue, green, and red display regions). Hence, it is difficult to satisfactorily separate the display colors at the display regions when the common liquid crystal material is used.

With the conventional liquid crystal material, the refractive index of the material itself does not change even when the electric field is applied, although the refractive index in the liquid crystal cell changes when viewed in one direction because the liquid crystal molecules change their directions and align into a form of spiral. In contrast, with the pseudo-isotropic liquid crystal material used in the invention, the refractive index of the material itself can be changed, since the material becomes optically anisotropic when the electric field is applied. With the pseudo-isotropic liquid crystal material used in the invention, the refractive index can be changed when the electric field is applied without accompanying the macroscopic alignment behavior and movement of the material itself. Further, because the amount of change in the refractive index depends on the strength of the electric field, it is possible to make the refractive index anisotropy An of the liquid crystal to be different at each of the display regions (the blue, green, and red display regions) by supplying each of the display regions with the electric field different in the strength. Thus, in the invention, it is possible to reliably prevent the colors of the display regions from interfering with each other and to display vivid colors. Further, because each color is displayed in a manner that the strength of the electric field differs in each display region of each color, the invention has high controllability.

Further, in the invention, because the refractive index anisotropy of the liquid crystal material (the pseudo-isotropic liquid crystal material) makes the vivid color display possible, it is not necessary to use the color filters. As a consequence, the light utilization efficiency can be particularly high, and high contrast and bright images can be obtained. Also, because sufficiently bright images can be obtained even when the applied voltage is relatively low, it also has an advantage of suppressing electricity consumption.

With the reflection-type liquid crystal display device, the transmitted light intensity J becomes maximum when $\Delta n \times d = \lambda/4$ according to the equation (4). Thus, with this liquid crystal display device, it is preferable that the strength of the electric field is set as $\Delta n \times d = \lambda/4$ at each display region. Consequently, the displays can be made brighter.

More specifically, in the red display region, for example, it is preferable that $\Delta n \times d$ is about 160 nm, given that $\lambda_r = 630$ nm. In the green display region, it is preferable that $\Delta n \times d$ is about 140 nm, given that $\lambda_g = 550$ nm. Further, in the blue display region, it is preferable that $\Delta n \times d$ is about 120 nm, given that $\lambda_b = 450$ nm.

Further, the pseudo-isotropic liquid crystal is driven by the lateral electric field F approximately in parallel with the substrate. Since this changes the retardation ($R = \Delta n \times d$) within the surface, there is little change in the retardation value due to the visual angle. As a consequence, it is possible to solve the problem of the visual angle dependency of the display color in the conventional ECB-type liquid crystal display device. Further, accordingly, it is possible to increase the light utilization efficiency, to display with higher visibility, and to further enhance reliability (durability) of the liquid crystal display device.

It is preferable that the cell thickness between the surface sides of the substrates (the TFT array substrate and the opposite substrate) facing the liquid crystal layer is 20 µm or less, more preferably, 10 µm or less. Consequently, the aforementioned effects are produced more evidently.

Further, with the lateral electric field system in the embodiment, the distance between the electrodes (the distance between the electrode finger 6a of the first electrode 6 and the electrode finger 7a of the second electrode 7) differs in each of the red, green, and blue display regions. Having such a structure, the magnitude of the electric fields at the red, green and blue display regions can be different from each other.

Thus, if the interelectrode distance at the red display region (Lr in the drawing), the interelectrode distance at the green display region (Lg in the drawing), and the interelectrode distance at the blue display region (Lb in the drawing) is to be different from one another, it is preferable that Lb>Lg>Lr. With such a structure (e.g., a simple structure in which the applied voltage is substantially the same at each display region), the strength of the electric field can be easily and reliably made less in the order from the red, green, and blue display regions.

The inter-electrode distance Lr at the red display region depends on the applied voltage and the like but is preferably about 0.2-10 µm, more preferably about 0.5-5 µm, and even more preferably about 1-3 µm. Also, the inter-electrode distance Lg at the green display region depends on the applied voltage and the like but is preferably about 0.4-20 µm, more preferably about 1-10 µm, and even more preferably about 2-6 µm. Further, the inter-electrode distance Lb at the blue display region depends on the applied voltage and the like but is preferably about 0.6-30 µm, more preferably about 1.5-15 µm, and even more preferably about 3-9 µm.

More specifically, if each electrode width (electrode finger width) is about 2 µm and the applied voltage is 7-8 V, for example, the inter-electrode Lr at the red display region is preferably about 2 µm; the inter-electrode Lg at the green display region is preferably about 4 µm; and the inter-electrode Lb at the blue display region is preferably about 6 µm. Having such a structure, the ECB-type liquid crystal display device can stably perform a vivid display at each display region, and the transmitted light intensity can be particularly high. Further, the light utilization efficiency can be improved, and the display can have a particularly bright composition. Furthermore, high contrast display can be obtained. Moreover, particularly high visibility can be acquired.

Pseudo-Isotropic Liquid Crystal Material

Next, the pseudo-isotropic liquid crystal material composing the liquid crystal display device 1 will be described in detail.

FIGS. 3A through 3D are pattern diagrams of the molecule structure of the pseudo-isotropic liquid crystal material that can be used in the invention.

The pseudo-isotropic liquid crystal material used in the invention is optically isotropic when the selective electric field is not applied and optically aisotropic when the electric field is applied, with its refractive index changing depending on the strength of the electric field.

Such a pseudo-isotropic liquid crystal material is, as described, completely different from the common liquid crystal material, showing completely different behavior from that of the common liquid crystal material, particularly when employed for the reflection-type or transmission-type liquid crystal display device. That is, with the conventional liquid crystal material, the refractive index of the material itself does not change even when the electric field is applied, although the refractive index in the liquid crystal cell changes when viewed in one direction because the liquid crystal molecules change in their directions and align into a form of spiral. In contrast, with the pseudo-isotropic liquid crystal material used in the invention, the refractive index of the material itself can be changed, since the material becomes optically anisotropic when the electric field is applied. With the pseudo-isotropic liquid crystal material used in the invention, the refractive index can be changed when the electric field is applied without accompanying the macroscopic alignment behavior and movement of the material itself.

The pseudo-isotropic liquid crystal material used in the invention may be any material so long as it is such as mentioned above. However, preferably, the material is such that is formed by polymerizing a low molecule liquid crystal material with a non liquid crystal monomer together with a crosslinking agent and that is composed of a composite liquid crystal composition that includes a polymer network formed among the constituent molecules of the low molecular liquid crystal material. Accordingly, the response speed of liquid crystal can be made particularly fast.

In the following, the pseudo-isotropic liquid crystal material will be described as one composed of such a composite liquid crystal composition.

Figure 3:
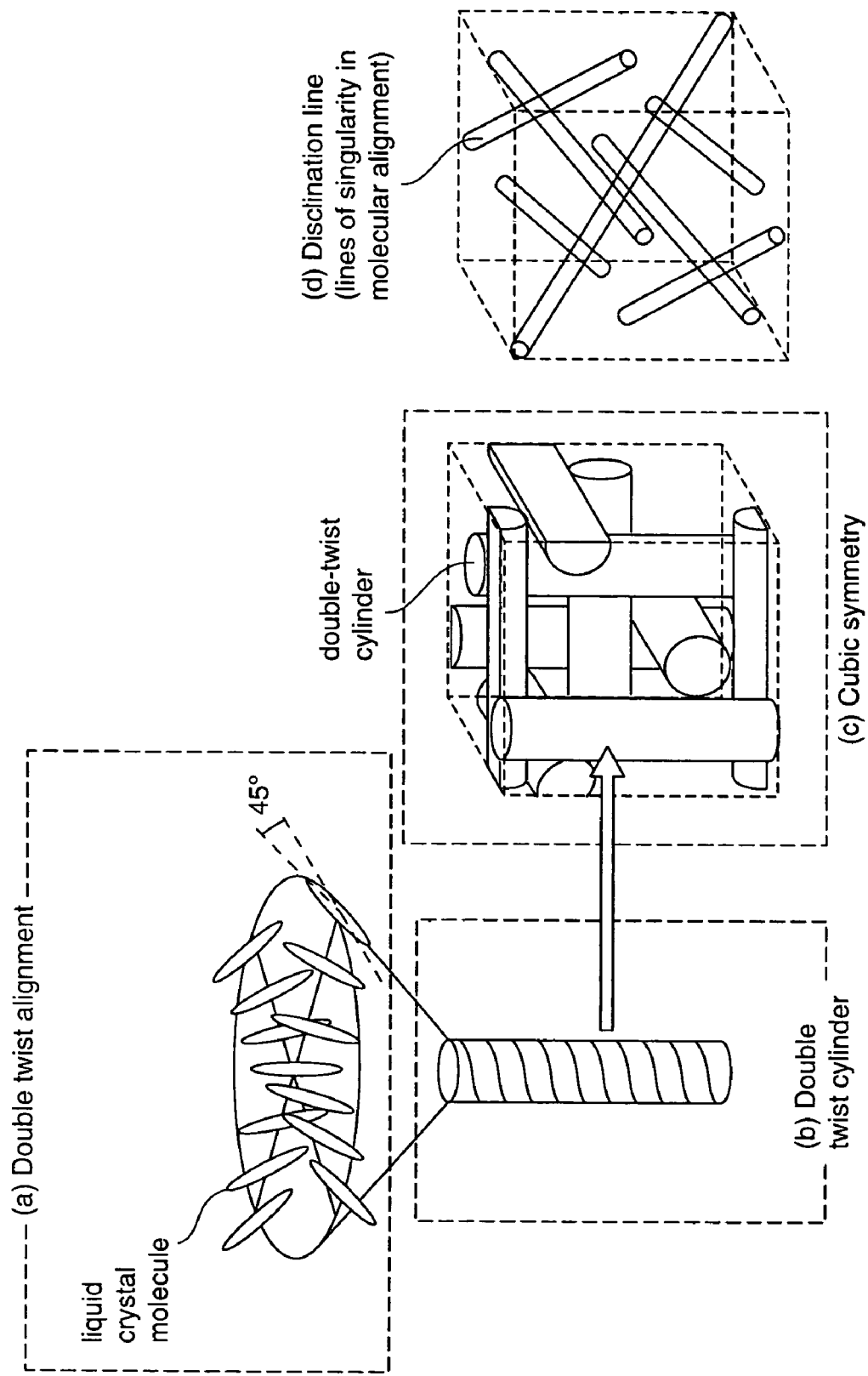
FIGS. 3A through 3D are pattern views of a molecule structure of a pseudo-isotropic liquid crystal material.

As shown in FIGS. 3A through 3D, the composite liquid crystal composition (the pseudo-isotropic liquid crystal material) takes, in general, a twist alignment in all azimuths of a molecular lateral direction and forms a basic structure called a double-twist cylinder as shown in FIG. 3A. Further, the double-twist cylinders (3B) crisscross each other to take an ultrastructure having a body-centered cubic system as the unit lattice shown in FIG. 3C. This structure, with which the molecules cannot continuously align in three-dimensional space, accompanies a periodical disclination as shown in the drawing. The composite liquid crystal composition (the pseudo-isotropic liquid crystal material) such as this is optically isotropic but turns aisotropic at a high speed when voltage is applied and is capable of transmitting or blocking light coming from a specific direction.

Further, the composite liquid crystal composition has the polymer network formed by polymerizing monomer molecules having low compatibility with the low molecular liquid crystal material (together with the crosslinking agent). Accordingly, it is possible to expand the range of temperature (e.g., the range of 100° C. or more) at which the blue phase is developed, and, thus, the response speed of liquid crystal can be made particularly fast.

The monomer used to form the polymer network is a non liquid crystal monomer. The non liquid crystal monomer here is a monomer that can be polymerized by photopolymerization or thermal polymerization and means a monomer that does not have a well-known rodlike molecular structure (e.g., a molecular structure having an alkyl group, cyano group, fluorine group, or the like at the end of a biphenyl group, a biphenyl cyclohexyl group, or the like) that exhibits liquid crystal. Such a monomer may contain, for example, a polymerizable group such as, but not limited to, an acryloyl group, methacryloyl group, vinyl group, epoxy group, fumarate group, cinnamoyl group, or the like in its molecular structure.

It is preferable that the non liquid crystal monomer used to form the polymer network is, for example, an acrylate-based monomer containing an acryloyl group or a methacryloyl group in its molecular structure, in particular, an acrylate-based monomer of a branched structure having an alkyl group as the side chain. The alkyl group is generally an alkyl group with the carbon number of 1 to 4, and it is preferable to use a monomer having at lease one side chain consisting of such an alkyl group per a monomer unit. When the polymer network is formed from a monomer having an amorphous molecular structure but not branched, the maximum effect on expanding the temperature width at which the blue phase is developed becomes relatively small. For example, the acrylate-based monomer can be cyclohexyle acrylate, and the acrylate-based monomer having the alkyl group as the side chain can be 2-ethylhexyl acrylate or 1,3,3-trimethylhexyl acrylate.

The polymer network is formed by polymerizing such a monomer together with the crosslinking agent. The crosslinking agent can be either a liquid crystalline compound or an amorphous compound and can be a compound having reactive sites that enable the formation of the network structure by combining the monomer molecules in response to the used monomer. For example, when using the acrylate-based monomer as the monomer, a liquid crystalline diacrylate monomer can be used as the crosslinking agent. However, if the crosslinking agent is not used or the density of the crosslinking agent is too low, it may be difficult, for example, to sufficiently expand the temperature range (temperature width) for the development of the blue phase. Further, the density of the polymer network is also important, and it is also necessary to form a highly continuous polymer network by using sufficient amounts of monomers and crosslinking agents in order to expand the temperature width to develop the blue phase.

The low molecular liquid crystal material composing the composite liquid crystal composition is preferably, but not particularly limited to, one that can develop the blue phase between a cholesteric phase (a chiral nematic phase) and an isotropic phase. Using such a material, the response speed of the liquid crystal can be faster. Such a low molecular liquid crystal material is, preferably, a material that can develop the cholesteric phase (the chiral nematic phase) either by having a molecular structure of biphenyl, terphenyl, biphenyl cyclohexyl, or the like or by adding a chiral material (a chiral dopant) and that can be selected from materials whose spiral pitch length in the cholesteric phase (the chiral nematic phase) is about 500 nm or less. Such liquid crystals develop the cholesteric phase (the chiral nematic phase) at a low temperature and develop the isotropic phase at a temperature higher than that, while also developing the blue phase within a small temperature zone between the cholesteric phase (the chiral nematic phase) and the isotropic phase. Various kinds of low molecular liquid crystal materials may be mixed when used.

The pseudo-isotropic liquid crystal material used in the embodiment is composed of the composite liquid crystal composition (of the polymer network/low molecular liquid crystal material) containing the low molecular liquid crystal material and the polymer network.

The composite liquid crystal composition such as this can be obtained as follows. That is, it can be obtained by dispersing the monomers and the crosslinking agents in the low molecule liquid crystal material and then carrying out the polymerization reaction under the blue-phase holding temperature.

Whether or not the blue phase is held can be confirmed by observing through a polarizing microscope and measuring a reflection spectrum. That is, if the blue phase is developed, blue and yellow-green platelets (small plate-like structures) characteristic of the blue phase are observed through the polarizing microscope, and the peak of the reflection spectrum is observed at a wavelength of about 550 nm which relates to the yellow-green platelets.

The polymerization can be carried out by thermal polymerization or photopolymerization, for example. However, in case of the thermal polymerization, there is a limitation in the range at which the blue-phase holding temperature overlaps with the polymerization temperature (a heating temperature), and, further, the application of heat may possibly change the configuration of the polymer network. Thus, the photopolymerization utilizing ultraviolet radiation is preferable. Further, at the time of polymerization, it is preferable to disperse beforehand polymerization initiators in addition to the monomers and the crosslinking agents in the low molecular liquid crystal material in order to speed up the polymerization. As the photopolymerization initiator, various types of initiators such as acetophenone-, benzophenone-, benzoin ether-, and thioxanthone-based initiators can be used. More specifically, 2,2-dimethoxy-2-phenylacetophenone can be used.

As thus described, in order to produce the liquid crystal material (the pseudo-isotropic liquid crystal material) composed of the composite liquid crystal composition, a mixed solution of the monomers and the crosslinking agents with addition of, if necessary, the polymerization initiators and the chiral dopants, which are dispersed in the low molecular liquid crystal material, is injected into appropriate cells and then subjected to the polymerization reaction as will be described below.

At first, the development of the blue phase is to be confirmed by the polarizing microscope observation and/or the reflection spectrum measurement by raising or lowering the temperature of the sample (the mixed solution) before it is subjected to the polymerization.

Next, the temperature of the sample is lowered or raised from the temperature at which the blue phase development was confirmed, and when it is confirmed that the yellow-green luminance has weakened (by the polarizing microscope observation and/or the reflection spectrum measurement), the ultraviolet rays are radiated. Then, when the yellow-green luminance of the platelets becomes stronger, the ultraviolet radiation is temporarily stopped.

Thereafter, the temperature of the sample is again raised or lowered. When the yellow-green luminance of the platelet has weakened again, the ultraviolet rays are radiated, and when the yellow-green luminance of the platelets becomes stronger, the ultraviolet radiation is temporarily stopped.

After repeating these operations, and after the blue-phase developing temperature (the temperature at which the yellow-green luminance of the platelets becomes strong) approximately matches with the blue-phase developing temperature of a single system of the low molecular liquid crystal material, the sample is further irradiated with ultraviolet for a certain period of time (e.g., one hour) to complete the polymerization.

The operations just described are those of the photopolymerization. In case of the thermal polymerization, the polymerization can be conducted by similarly confirming the blue phase development by the polarizing microscope observation and/or the reflection spectrum measurement and by maintaining the system at temperatures at which the polymerization reaction progresses.

The pseudo-isotropic liquid crystal material composed of the composite liquid crystal composition obtained by the described polymerization reaction exhibits a stable blue phase within an extremely wide temperature range (temperature width). For example, some of the liquid crystal materials containing the polymer network that is formed from the preferable acrylate-based monomers having the alkyl group side chains can exhibit the blue phase at temperature in the range between more than 60° C. below and above the room temperature (15-25° C.). The obtained blue phase development of the liquid crystal material can also be confirmed by the same polarizing microscope observation and the reflection spectrum measurement.

Thus obtained pseudo-isotropic liquid crystal material is optically isotropic when the selective electric field is not applied and becomes optically aisotropic at a high speed when the electric field is applied and can transmit and block the light from a predetermined direction. Further, the response speed is 10-100 μseconds.

Second Embodiment

In the following, the second embodiment of the liquid crystal display device of the invention will be described with reference to the drawings.

FIGS. 4A and 4B are pattern diagrams showing the liquid crystal display device of the present embodiment. FIG. 4A is a plan pattern diagram to explain the three display regions corresponding to the three primary colors of the liquid crystal display device of the embodiment. FIG. 4B is a cross-sectional pattern view of FIG. 4A. Further, for simplicity's sake, FIGS. 4A and 4B show an enlarged pixel region, emphasizing specific portions and altering the ratios of the film thickness, size, and the like of each constituent element where necessary.

The liquid crystal display device of the first embodiment is the reflection-type liquid crystal display device (the color liquid crystal display device). In contrast, the liquid crystal display device of the second embodiment is the transmission-type liquid crystal display device (the color liquid crystal display device), and the same embodiment applies as the first embodiment, except that the electrode composition differs from that in the first embodiment. Accordingly, in FIGS. 4A and 4B, the same reference numbers are given to the like constituent elements, and the descriptions thereof will be omitted.

In the first embodiment, the reflection-type liquid crystal display device employing the IPS electrode structure was described. In the present embodiment, an example of the transmission-type liquid crystal display device employing the electrode structure of a fringe-field switching (hereinafter referred to as "FFS") mode, which is a modified IPS technology, will be described.

With the liquid crystal display device 1 of this embodiment, a first electrode 60 composed of a transparent conductive film such as an ITO is formed on the insulating layer 12 in the TFT array substrate 10 and is electrically connected to the pixel-switching TFT.

Further, on the first electrode 60, an interlayer insulating layer 15 composed of a light transmitting material is formed. On the interlayer insulating layer 15, there is formed a second electrode 70 composed of a transparent conductive film such as an ITO having a film thickness of around some thousand nanometers and having a plurality of electrode fingers 70a that extend in a paper-surface penetrating direction in FIG. 4B.

The liquid crystal display device 1 of the embodiment employs the FFS mode electrode structure, in which the second electrode 70 is laminated via the interlayer insulating layer 15 at the upper part of the first electrode 60 in the TFT substrate 10. Thus, the liquid crystal is driven by the lateral electric field F generated by the first and second electrodes 60 and 70.

In addition, as the light source for the transmission display, there is a backlight 40 outside the polarizing plate 17 which is formed in the TFT array substrate 10.

Also, in the embodiment, it is structured in such a manner that the amount of voltage applied between the pixel electrode (the second electrode 70 (70a)) and the common electrode (the first electrode 60) varies at each of the red, green, and blue display regions. More specifically, the voltages applied between the pixel and the common electrode decreases in the order from the red, green, and blue display regions. Having such a structure, the strength of the electric field can be easily and reliably set different at each of the red, green, and blue display regions (more specifically, the strength of the electric field decreases in the order from the red, green, and blue display regions). Further, because the distance between the pixel electrode and the common electrode can be approximately fixed in each display region, it is easy to manufacture the liquid crystal display device. Further, by setting the strength of the electric field to be different at each display region, controllability improves, and vivid color displays become possible since the lights do not interfere with each other.

With the transmission-type liquid crystal display device, the transmitted light intensity J becomes maximum when $\Delta n \times d = \lambda/2$ according to the previous equation (4). Thus, with this liquid crystal display device, it is preferable that the strength of the electric field is set as $\Delta n \times d = \lambda/2$ for each display region. This enables brighter displays.

More specifically, in the red display region, for example, it is preferable that $\Delta n \times d$ is about 310 nm, given that $\lambda_r = 630$ nm. In the green display region, it is preferable that $\Delta n \times d$ is about 270 nm, given that $\lambda_g = 550$ nm. Further, in the blue display region, it is preferable that $\Delta n \times d$ is about 220 nm, given that $\lambda r = 450$ nm.

Having such a structure, the ECB-type liquid crystal display device can stably exhibit a vivid display at each display region, and, at the same time, the transmitted light intensity can be particularly high. Further, the light utilization efficiency can be improved, and the display can be particularly bright. Furthermore, the high contrast display can be obtained. Moreover, particularly high visibility can be acquired.

Preferably, the distance between the second electrode 70 (70a) and the first electrode 60 is, but not limited to, about 2-8 μm, more preferably about 2-5 μm, and even more preferably about 1-3 μm.

As thus described, with the liquid crystal display device of the invention, the so-called pseudo-isotropic liquid crystal material that shows aisotropy upon application of the electric field is used, and, further, the strength of the electric field can be made suitably different at the red, green, and blue display regions. Accordingly, the problems of light utilization efficiency and visual angle dependency of the conventional ECB-type liquid crystal display device can be solved.

Further, because the liquid crystal display device of the invention utilizes the pseudo-isotropic liquid crystal material, it is not necessary to form an alignment film or to carry out a rubbing process in the manufacture. As a consequence, productivity of the liquid crystal display device can be improved, and this leads to cost reduction.

Moreover, the liquid crystal display device 1 employs the lateral electric field system as described, and the effect produced therefrom is good visibility from any viewing angles.

Electronic Apparatus

Figure 5:
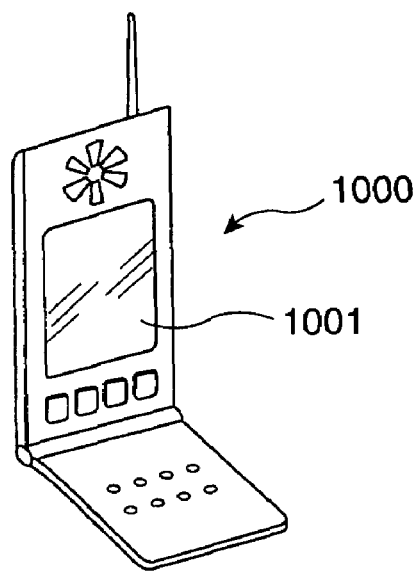
FIG. 5 is a diagram illustrating an example of an electronic apparatus equipped with the liquid crystal display device of the invention.

In the following, an exemplary electronic apparatus having the liquid crystal display device of the embodiment will be described. FIG. 5 is a perspective diagram illustrating an example of a cellular phone. In FIG. 5, the reference number 1000 indicates the cellular phone body, and the reference number 1001 indicates a liquid crystal display portion using the liquid crystal display device.

Figure 6:
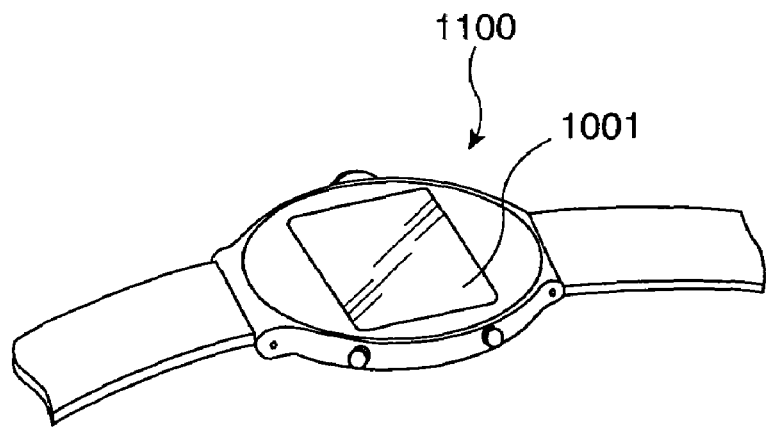
FIG. 6 is a diagram illustrating another example of the electronic apparatus equipped with the liquid crystal display device of the invention.

FIG. 6 is a perspective diagram illustrating an example of a wristwatch type electronic apparatus. In FIG. 6, the reference number 1100 indicates the watch body, and the reference number 1101 indicates a liquid crystal display portion using the liquid crystal display device.

Figure 7:
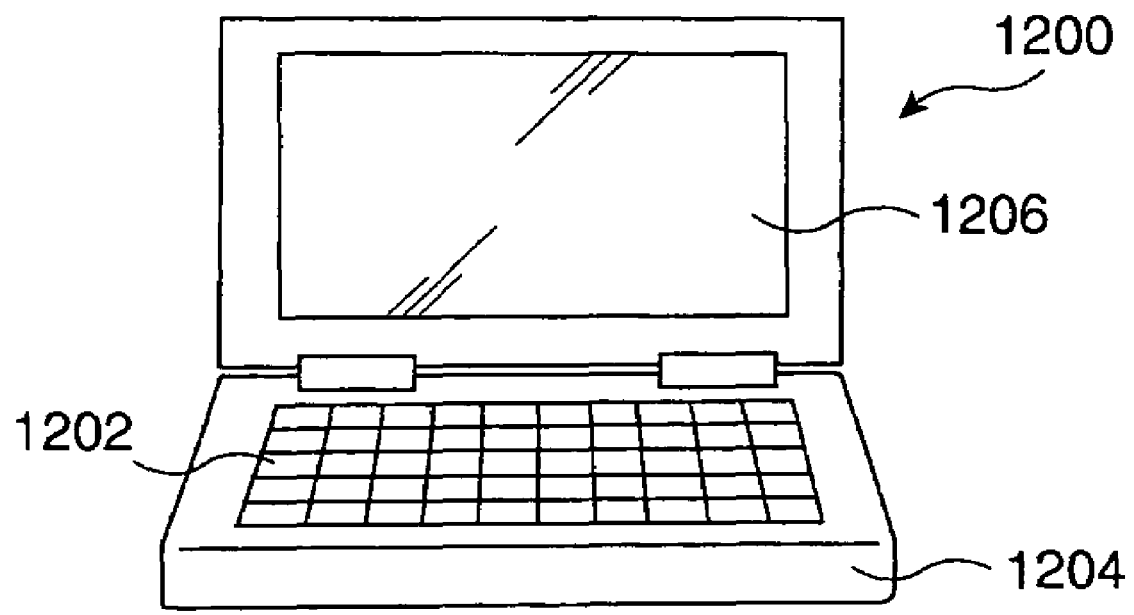
FIG. 7 is a diagram illustrating yet another example of the electronic apparatus equipped with the liquid crystal display device of the invention.

FIG. 7 is a perspective diagram illustrating an example of a portable data processing apparatus such as a word processor or a personal computer. In FIG. 7, the reference number 1200 indicates a data processing apparatus; the reference number 1202 indicates an input portion such as a keyboard; the reference number 1204 indicates the data processing apparatus body; and the reference number 1206 indicates a liquid crystal display portion using the liquid crystal display device.

Because the electronic apparatuses shown in FIGS. 5 through 7 are equipped with the liquid crystal display portion using the liquid crystal display device of the embodiments, they can have the wide visible angle and can exhibit the bright and high quality display.

Descriptions have now been made of the invention based on the preferred embodiments; however, the invention is not limited to these embodiments.

For example, in the embodiments, the exemplary structure of the first electrode and the pixel-switching TFT being electrically connected is described. However, another structure is possible, in which the second electrode and the pixel-switching TFT are electrically connected.

Further, the shape, size, etc. of each of the constituting elements such as the first electrode, second electrode, data line, gate line, and the like as well as the number of the electrode fingers are not limited to those described in detail in the embodiments and can be suitably re-designed and modified.

Moreover, in the embodiments, the liquid crystal display device is described as one that does not have the alignment films. However, the liquid crystal display device may have the alignment films, for example, on the surface sides facing the liquid crystal layer of the electrode. Further, a layer (a passivation film) or the like may be disposed between the electrode and the liquid crystal layer in order to prevent the electrode and the liquid crystal material from contacting each other. Having such a structure, the liquid crystal material can be highly durable, and the liquid crystal display device as a whole can be more reliable. A material composing such a film is, for example, carbon oxide (e.g., SiO or SiO2).

Additionally, it is described in the embodiments that the liquid crystal display device does not include the color filters. However, the liquid crystal display device may include the color filters. By doing so, the ECB display can have much purer colors. If the color filters are included, even if they are relatively low in concentration (color concentration), the effects as described above can be sufficiently produced, and the light utilization efficiency can be satisfactorily enhanced.

Further, in the embodiments, the exemplary of the FFS mode electrode structure in which the second electrode is laminated on the first electrode via the insulating layer is described. However, other structures may be employed, such as a structure in which the inter-electrode distance is made shorter than the cell gap by using the same layer structure as the IPS.

Furthermore, although the reflection-type liquid crystal display device having the IPS mode electrode structure and the transmission-type liquid crystal display device having the FFS mode electrode structure are described in the embodiments, other structures are possible. For example, the liquid crystal display device may be a transmission-type liquid crystal display device having the IPS mode electrode structure or be a reflection-type liquid crystal display device having the FFS mode electrode structure. Further, the invention may be applied to a liquid crystal display device of other modes such as a vertical alignment (VA) mode. Moreover, the invention may also be applied to a semi-transmission liquid crystal display device.

WORKING EXAMPLES

Manufacture of Liquid Crystal Material

As the photopolymerizable monomer, amorphous 2-ethylhexyl acrylate (2EHA) (manufactured by Aldrich Chemical Company), hexyl acrylate (HA) (manufactured by Aldrich Chemical Company), and 1,3,3-trimethylhexyl acrylate (TMHA) (manufactured by Aldrich Chemical Company), and liquid crystalline 6-(4'-cyanobiphenyl-4-yloxy) hexyl acrylate (6CBA) are used. As the crosslinking agent, liquid crystalline diacrylate monomer (RM257) (manufactured by Merck) is used. As the photopolymerization initiator, 2,2-dimethoxy-2-phenylacetophenone (manufactured by Aldrich Chemical Company) is used. As the low molecular liquid crystal material, fluorine-based nematic-mixed liquid crystal, JC-1041XX(7) (manufactured by Chisso Corporation), and cyanobiphenyl-based nematic liquid crystal, 4-cyano-4'-pentylbiphenyl (5CB) (manufactured by Aldrich Chemical Company), are mixed in equal mol. As the chiral dopant, ZLI-4572 (9) (manufactured by Merck) is used.

A mixed solution of the above-referenced constituents prepared at specified composition is injected into a non-oriented sandwich type cell in an isotropic phase state having the cell thickness of 14 μm. Upon injection of each sample, the cell is observed through the polarizing microscope under crossed Nicol prisms, and, while confirming that the BP (blue phase) is being held by following the previously described methods, the polymerization is carried out by irradiating the cell for more than 1 hour with ultraviolet rays having the irradiation intensity of 1.5 mW.cm$^{-2}$ obtained from a metal halide lamp.

Working Example 1

Figure 2:
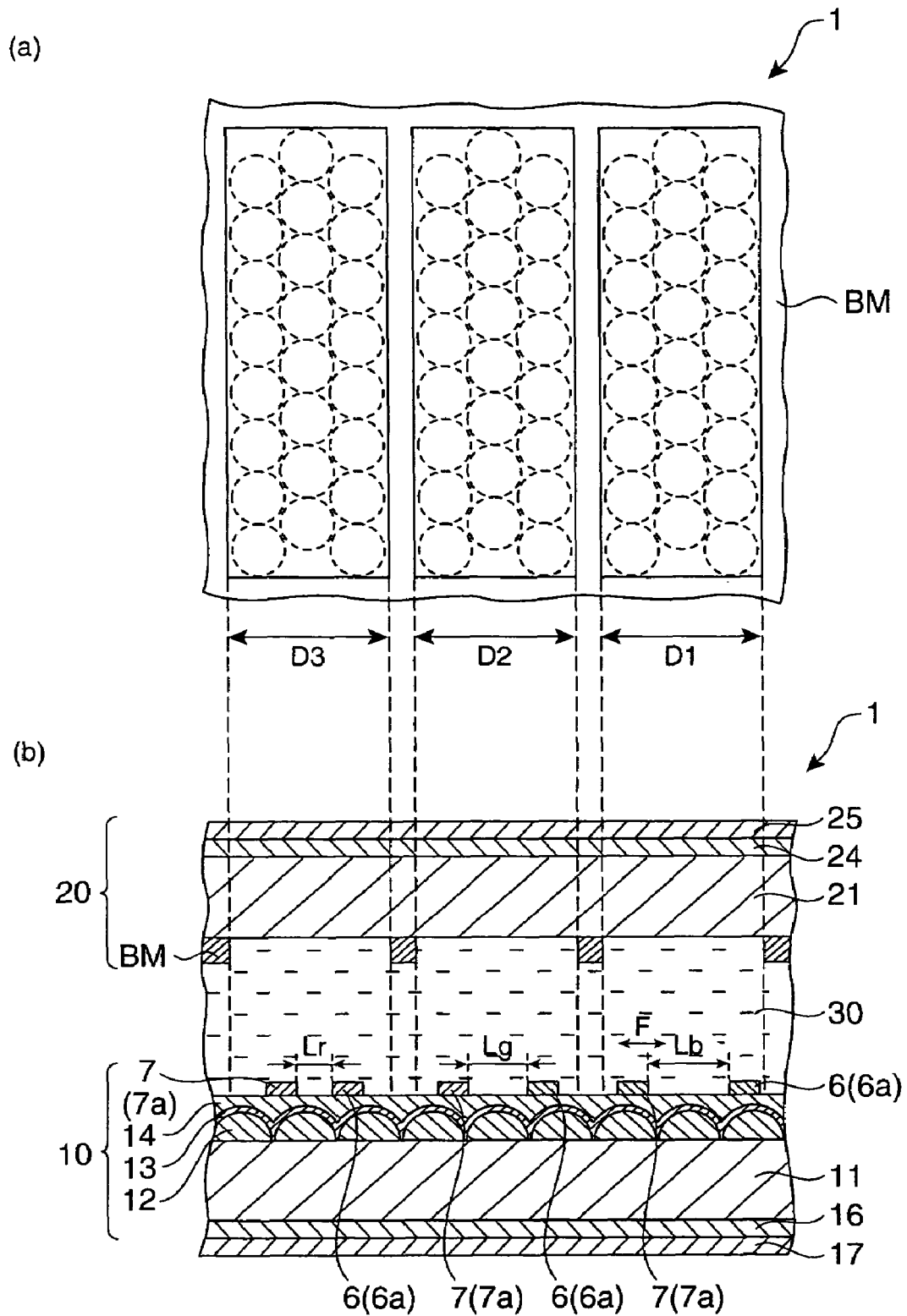
FIG. 2A is a plan pattern view of an example of the liquid crystal display device of the invention.
FIG. 2B is a cross-sectional pattern view of FIG. 2A.

Using thus obtained pseudo-isotropic liquid crystal material, the IPS mode reflection-type liquid crystal display device identical to the liquid crystal display device shown in FIG. 2 is manufactured.

In this case, the phase difference in the liquid crystal layer is set as $\Delta n \times d = \lambda/4$. The absorption axis of the polarizing plate is set to be in a direction 45° from the longitudinal direction of the transparent electrode. Further, the electrode finger width is set at 2 μm; the inter-electrode distance at the red display region is set at 2 μm; the inter-electrode distance at the green display region is set at 4 μm; and the inter-electrode distance at the blue display region is set at 6 μm.

Further, 7.5V voltage is applied to this liquid crystal display device to display a color image of a predetermined pattern. As a result, a high contrast and bright color image was displayed.

Working Example 2

Figure 4:
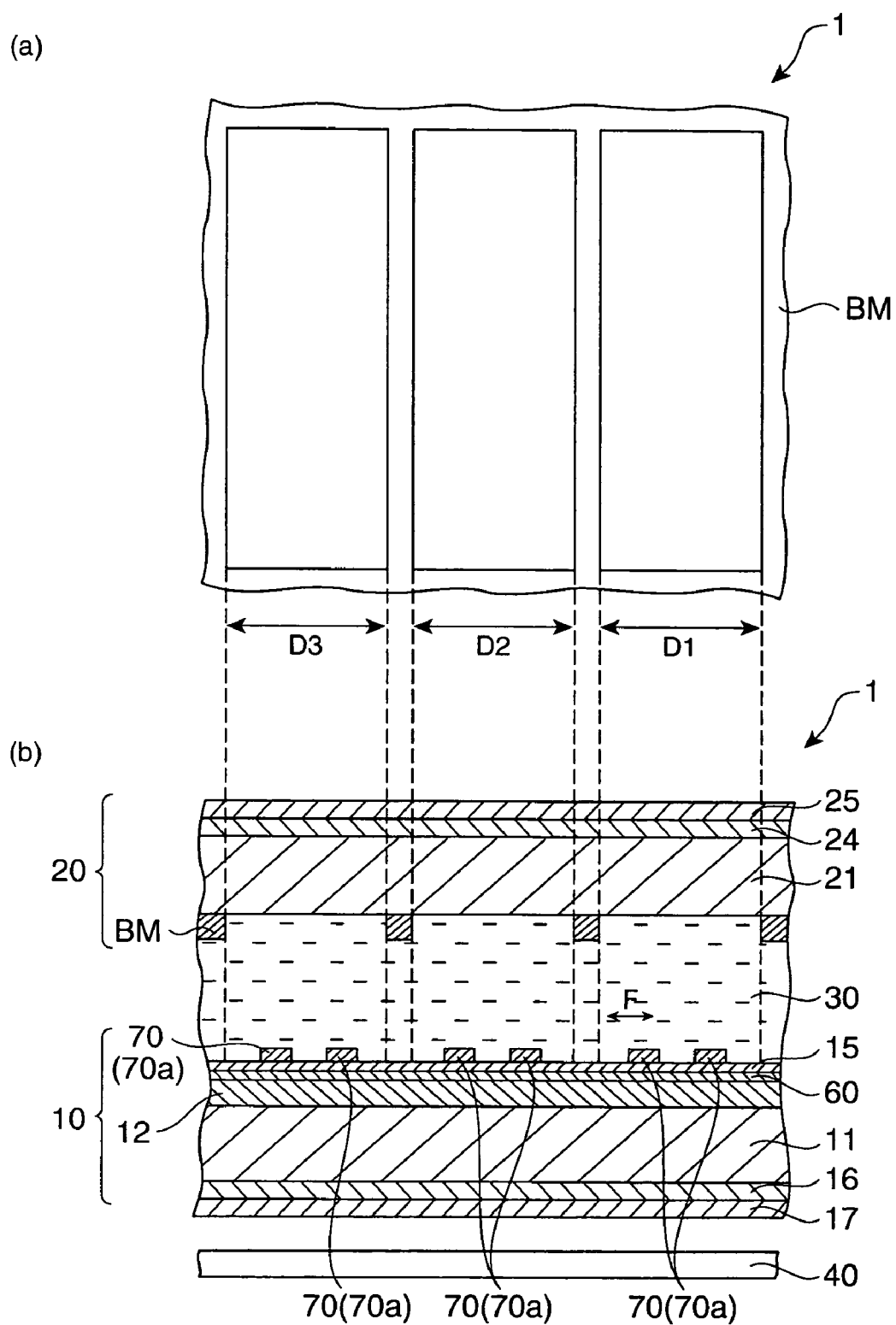
FIG. 4A is a plan pattern view of another example of the liquid crystal display device of the invention.
FIG. 4B is a cross-sectional pattern view of FIG. 4A.

Using the obtained pseudo-isotropic liquid crystal material, the FFS mode transmission-type liquid crystal display device identical to the liquid crystal display device shown in FIG. 4 is manufactured.

In this case, the phase difference in the liquid crystal layer is set as $\Delta n'd = \lambda/2$. The absorption axis of the polarizing plate is arranged parallel to the longitudinal direction of the transparent electrode. The retardation plate is disposed at 15° from the longitudinal direction. Further, the electrode finger width is set at 2 μm, and the inter-electrode distance at the red, green, and blue display regions are all set at 3 μm.

Further, with this liquid crystal display device, 6V voltage is applied to the red display region; 4V voltage is applied to the green display region; and 3V voltage is applied to the blue display region so as to display a color image of a predetermined pattern. As a result, a high contrast and bright color image was displayed.

Comparative Example 1

A liquid crystal display device is manufactured in the same manner as in the working example 1, except that nematic liquid crystals of positive dielectric anisotropy are used.

Then, similarly to the working example 1, a color image of a predetermined pattern is displayed using this liquid crystal display device. As a result, the obtained image had so-called blurs and no vivid color image could be displayed.

Comparative Example 2

A liquid crystal display device is manufactured in the same manner as in the comparative example 1, except that the inter-electrode distance (the distance between the electrode finger of the first electrode and the adjacent electrode finger of the second electrode) is fixed at each of the display regions (red, green, and blue display regions) of colors corresponding to the three primary colors and that each display region of each color is provided with the corresponding color filter. The inter-electrode distance (the distance between the electrode finger of the first electrode and the adjacent electrode finger of the second electrode) in each display region of each color is 3 μm.

Then, a color image of a predetermined pattern is displayed similarly to the working example 1, except that the applied voltage is set at 30V. As a result, the obtained image was extremely dark and the contrast was insufficient.

The entire disclosure of Japanese Patent Application No. 2005-054822, filed Feb. 28, 2005 is expressly incorporated by reference herein.

What is claimed is:

1. A liquid crystal display device, comprising:
   a first substrate;
   a second substrate;
   a liquid crystal layer disposed between the first and second substrates, the liquid crystal layer being optically isotropic when a selective electric field is not applied, the liquid crystal layer being optically anisotropic when an electric field is applied, a refractive index of a material of the liquid crystal layer being changed depending on a strength of an electric field the liquid crystal layer including a composite liquid crystal composition, the composite liquid crystal composition including a low molecule liquid crystal material and a polymer network, the polymer network being formed among constituent molecules of the low molecule liquid crystal material, and the polymer network being formed by polymerizing nonliquid crystal monomers, the low molecule liquid crystal material having a blue phase between a cholesteric phase and an isotropic phase;
a first pixel formed on the first substrate, the first pixel having a first electric field strength;
a second pixel formed on the first substrate, the second pixel having a second electric field strength, the first electric field strength and the second electric field strength being different; and
a reflective film formed between the first substrate and the liquid crystal layer, a portion of the liquid crystal layer being overlapped with the reflective film, the portion of the liquid crystal layer having an optical phase difference $\Delta nd$, the optical phase difference $\Delta nd$ being approximately $\lambda/4$.

2. The liquid crystal display device according to claim 1, the first pixel displaying a first color, the second pixel displaying a second color, the first color and the second color being different, the first pixel having at least a first pixel electrode and at least a first common electrode, the first pixel having a first distance between the first pixel electrode and the first common electrode, the second pixel having at least a second pixel electrode and at least a second common electrode, the second pixel having a second distance between the second pixel electrode and the second common electrode, the first distance and the second distance being different, each of the first pixel electrode, the first common electrode, the second pixel electrode and the second common electrode being positioned between the first substrate and the liquid crystal layer, a first electric field being generated between the first pixel electrode and the first common electrode, and a second electric field being generated between the second pixel electrode and the second common electrode.

3. The liquid crystal display device according to claim 2, at least a first portion of the liquid crystal layer being overlapped with the first pixel, at least a second portion of the liquid crystal layer being overlapped with the second pixel, the first portion and the second portion having different refractive indexes.

4. The liquid crystal display device according to claim 2, a first portion of the liquid crystal layer being overlapped with the first pixel, a first light of a first wavelength being modulated by the first portion, a second portion of the liquid crystal layer being overlapped with the second pixel, a second light of a second wavelength being modulated by the second portion, the first distance being larger than the second distance, the first wavelength being shorter than the second wavelength.

5. The liquid crystal display device according to claim 4, the first color being blue and the second color being green.

6. The liquid crystal display device according to claim 2, the first color and the second color being different so that the liquid crystal display device requires no color filters.

7. The liquid crystal display device according to claim 1, the liquid crystal layer including a pseudo-isotropic liquid crystal.

8. An electronic apparatus including the liquid crystal display device according to claim 1.

9. A liquid crystal display device, comprising:
a first substrate;
a second substrate;
a liquid crystal layer disposed between the first and second substrates, the liquid crystal layer being optically isotropic when a selective electric field is not applied, the liquid crystal layer being optically anisotropic when an electric field is applied, a refractive index of a material of the liquid crystal layer being changed depending on a strength of an electric field, the liquid crystal layer including a composite liquid crystal composition, the composite liquid crystal composition including a low molecule liquid crystal material and a polymer network, the polymer network being formed among constituent molecules of the low molecule liquid crystal material, and the polymer network being formed by polymerizing nonliquid crystal monomers, the low molecule liquid crystal material having a blue phase between a cholesteric phase and an isotropic phase a portion of the liquid crystal layer having an optical phase difference $\Delta nd$, the optical phase difference $\Delta nd$ being approximately $\lambda/2$;
a first pixel formed on the first substrate, the first pixel having a first electric field strength; and
a second pixel formed on the first substrate, the second pixel having a second electric field strength, the first electric field strength and the second electric field strength being different.

10. The liquid crystal display device according to claim 9, the first pixel displaying a first color, the second pixel displaying a second color, the first color and the second color being different, the first pixel having a first electrode and a second electrode, both the first electrode and the second electrode being positioned between the first substrate and the liquid crystal layer, an electric field being generated between the first electrode and the second electrode.

11. The liquid crystal display device according to claim 10, the first color and the second color being different so that the liquid crystal display device requires no color filters.

12. A liquid crystal display device, comprising:
a first substrate;
a second substrate;
a liquid crystal layer disposed between the first and second substrates, the liquid crystal layer being optically isotropic when a selective electric field is not applied, the liquid crystal layer being optically anisotropic when an electric field is applied, a refractive index of a material of the liquid crystal layer being changed depending on a strength of an electric field, the liquid crystal layer including a composite liquid crystal composition, the composite liquid crystal composition including a low molecule liquid crystal material and a polymer network, the polymer network being formed by polymerizing nonliquid crystal monomers, the low molecule liquid crystal material having a blue phase between a cholesteric phase and an isotropic phase;
a first pixel formed on the first substrate, the first pixel having a first electric field strength; and
a second pixel formed on the first substrate, the second pixel having a second electric field strength, the first electric field strength and the second electric field strength being different.

13. The liquid crystal display device according to claim 12, the non liquid crystal monomer being an acrylate-based monomer that has an alkyl group as the side chain.

14. The liquid crystal display device according to claim 12, the first pixel displaying a first color, the second pixel displaying a second color, the first color and the second color being different, the first pixel having a first electrode and a second electrode, both the first electrode and the second electrode being positioned between the first substrate and the liquid crystal layer, an electric field being generated between the first electrode and the second electrode.

15. The liquid crystal display device according to claim 14, the first color and the second color being different so that the liquid crystal display device requires no color filters.

* * * * *